United States Patent
Van Tuijl et al.

[11] Patent Number: 6,002,453
[45] Date of Patent: Dec. 14, 1999

[54] DEFLECTION WITH LOW OFFSET

[75] Inventors: Adrianus J. M. Van Tuijl; Erik Van Der Ven, both of Nijmegen, Netherlands

[73] Assignee: U.S. Philips Corporation, New York, N.Y.

[21] Appl. No.: 08/941,639

[22] Filed: Sep. 30, 1997

[30] Foreign Application Priority Data

Oct. 14, 1996 [EP] European Pat. Off. ............... 96202854

[51] Int. Cl.$^6$ .................. H04N 5/68; G09G 1/04
[52] U.S. Cl. .................. 348/805; 315/403; 315/387; 315/399
[58] Field of Search .................. 348/739, 805, 348/806, 529; 315/403, 408, 400, 399, 387, 388, 389, 391; H04N 5/68, 9/16

[56] References Cited

U.S. PATENT DOCUMENTS

| | | | |
|---|---|---|---|
| 4,692,670 | 9/1987 | Imaizumi et al. | 315/388 |
| 4,716,378 | 12/1987 | Jiko et al. | 330/108 |
| 4,833,371 | 5/1989 | Boon et al. | 315/403 |
| 5,177,414 | 1/1993 | Imanishi | 315/403 |

OTHER PUBLICATIONS

Philips Semiconductors Application Note AN 95029 "TDA 8350 and TDA 8351 deflection output circuits Application information".

*Primary Examiner*—Michael H. Lee
*Attorney, Agent, or Firm*—Edward W. Goodman

[57] ABSTRACT

A series arrangement of a deflection coil (Lf) and a series resistor (Rs) is connected between an output of a first output amplifier (1) and an output of a second output amplifier (2) to be driven in a bridge configuration for generating a deflection current (If) through the deflection coil (Lf). Across the series resistor (Rs), a voltage is generated which corresponds to the deflection current (If). A differential amplifier (5) has a first input connected to a first end of the series resistor (Rs). A second input of the differential amplifier (5) is connected to a second end of the series resistor (Rs) via a conversion resistor (Rc). An input current (Ii) is generated through the conversion resistor (Rc). The polarity of the input current (Ii) is selected to obtain a voltage across the conversion resistor (Rc) which has an opposite polarity with respect to the voltage across the series resistor (Rs). The differential amplifier (5) has two outputs connected to respective inputs of the first and the second output amplifiers (1, 2) to drive the two output amplifiers (1, 2) in a feedback loop in such a manner that the voltage across the series arrangement of the conversion resistor (Rc) and the series resistor (Rs) is substantially zero. In this way, the voltage swing between the inputs of the differential amplifier (5) is very low and thus the offset voltage caused will be very low.

16 Claims, 4 Drawing Sheets

DEFLECTION WITH LOW OFFSET

BACKGROUND OF THE INVENTION

The invention relates to a deflection circuit for generating an electron beam deflection current in a deflection coil, the deflection circuit comprising: a first and a second output amplifier, a series resistor arranged in series with the deflection coil, the series arrangement of the deflection coil and the series resistor being coupled between an output of the first output amplifier and an output of the second output amplifier, a differential amplifier having a first input coupled to a first end of the series resistor, and having outputs coupled to corresponding inputs of the first and the second output amplifier, respectively, for driving the first and second output amplifiers in a bridge configuration.

The invention also relates to a picture display apparatus comprising such a deflection circuit, and to an integrated circuit for use in such a deflection circuit.

DESCRIPTION OF THE RELATED ART

The Philips Semiconductors Application Note AN95029 "TDA 8350 and TDA 8351 deflection output circuits Application information" discloses an integrated power circuit for use in a raster scan circuit. The integrated power circuit has a first and a second output amplifier which are arranged in a bridge configuration to generate a deflection current through a raster scan deflection coil. The deflection current generates a magnetic field deflecting electron beams in a cathode ray tube in the vertical direction. A measurement resistor is arranged in series with the deflection coil. Across this measurement resistor, a voltage is generated which is related to the deflection current through the deflection coil. The voltage across the measurement resistor is sensed with a first voltage-to-current converter which has a first and a second current output. To provide a feedback, the first current output is connected to an input of the first output amplifier, and the second current output is connected to an input of the second output amplifier. The integrated power circuit further comprises a second voltage-to-current converter which has two inputs for receiving an input waveform occurring across an input resistor. The second voltage-to-current converter has a first and a second current output. The first current output is connected to the input of the first output amplifier, and the second current output is connected to the input of the second output amplifier. The first and the second voltage-to-current converters are identical. The current outputs of the first and the second voltage-to-current converters, which are interconnected, supply output currents which have opposite polarities. In this way, the output voltages of the output amplifiers will be controlled such that the voltages across the measurement resistor and the input resistor are substantially equal. This implies that the ratio of the deflection current and the current through the input resistor is equal to the ratio of the input resistor and the measurement resistor.

In practical applications, the peak-peak voltage across the measurement resistor due to the deflection current is in the order of one volt. The same holds then for the peak-peak voltage of the input waveform. The first and second voltage-to-current converters comprise bipolar differential input stages to which emitter resistors are added to handle the high voltage swing. It is a drawback of the known deflection circuit that an offset voltage occurs due to mismatch of the emitter resistors. This offset voltage gives rise to a DC-shift of the deflected picture. An adjustment is needed to compensate for this DC-shift.

SUMMARY OF THE INVENTION

It is an object of the invention to provide a deflection circuit with an improved offset behavior.

An aspect of the invention is characterized in that the deflection circuit further comprises a conversion resistor having: a first end coupled to a second input of the differential amplifier, the first end receiving an input current having an input waveform, and a second end coupled to a second end of the series resistor.

A further aspect of the invention provides a picture display apparatus comprising a deflection circuit as described above.

A further aspect of the invention provides a integrated circuit for use in a deflection circuit as is described above.

In the deflection circuit according to the invention, the differential amplifier receives, as an input voltage, the voltage which occurs across the series arrangement of the conversion resistor and the series resistor. The input waveform is supplied as an input current through the conversion resistor. The polarity of the input current is selected to obtain voltage across the conversion resistor which has an opposite polarity with respect to the voltage across the series resistor. The differential amplifier drives the two output amplifiers in a feedback loop such that the voltage across the series arrangement of the conversion resistor and the series resistor becomes equal to zero. In this way, the voltage swing between the inputs of the differential amplifier is very low and, thus, the offset caused is also very low. In generally known AC-coupled frame deflection circuits, a low offset is not an issue as it does not cause a DC-shift. It is a further advantage of the low offset that in the selection of the scan supply voltage, it is not needed to take account of a possibility to adjust for a DC-offset, which enables an as low scan supply voltage as possible, thereby reaching a higher efficiency. Also, the influence of aging and temperature on the offset will be negligible.

In an embodiment of the invention, the influence on the feedback of the current flowing through a damping impedance arranged in parallel with the deflection coil is compensated at least partly. In the following, first the problem caused by the current through the damping impedance is explained, then it is elucidated how the measures of the invention overcome this problem.

As, during the scan period, the deflection coil may be regarded as a resistor, a relatively small scan voltage suffices to generate the deflection current during the scan period. During the relatively short flyback period, a quick reversal of the deflection current polarity has to be obtained. For such quick current changes, the deflection coil has to be regarded as an inductance, and, therefor, a large flyback voltage is needed to obtain a short flyback period. During the scan period, the first and second output amplifiers receive a relative low scan supply voltage to minimize dissipation. During the flyback period, a high flyback supply voltage is connected to the output of the first output amplifier. The flyback supply voltage is connected to the output of the first output amplifier if the current supplied at the input of the first output amplifier increases above a certain level. The flyback voltage will be disconnected as soon as the current supplied to the input of the first output amplifier decreases below the certain level. It is of course possible to use another information to connect and disconnect the flyback supply voltage, as an example, a comparison of the input waveform and the voltage across the series resistor may be used. It is also possible to disconnect the flyback supply voltage at the moment that the output voltage of the first output amplifier rises above the scan supply voltage.

A damping resistor is arranged in parallel with the deflection coil for smoothening switching points of the currents and voltages which occur in the raster scan circuit, as well to prevent ringing. In an embodiment of the invention, it is recognized that the current through the damping resistor depends on the voltage across the deflection coil, and thus, this current has a small value during the scan period and a large value during the flyback period. Due to the large current through the damping resistor during the flyback period, the certain level of the input current of the first output amplifier is reached too early. Consequently, the deflection current has not reached the starting value as is needed at the start of the scan. Depending on the application, this causes compressed lines, bright lines or flyback lines to become visible. A longer vertical blanking can solve the problem.

The known frame deflection output circuit has an internal compensation for the effect of the current through the damping resistor by adapting a bias current through a differential input stage which measures the voltage across the series resistor. The bias current is enlarged with a fixed amount during the flyback period. As the flyback voltage will be disconnected as soon as the current supplied to the input of the first output amplifier decreases below the certain level, the higher input current causes the period in which the flyback voltage is connected to become longer. The known frame deflection circuit has the drawback that the compensation is optimal only for one combination of the impedance of the deflection coil, the value of the damping resistor, the value of the flyback voltage, and the value of the scan voltage. Further, due to tolerances in the integrated circuit design, the fixed amount with which the bias current is adapted also shows tolerances. The foregoing has the drawback that a longer flyback period or a higher flyback supply voltage has to be chosen. However, a longer flyback period makes the deflection circuit unsuitable for applications requiring a short flyback period. Further, the flyback voltage is limited by the process in which the integrated circuit has been diffused, and thus cannot be enlarged above the process limit. Both these facts disable the use of the integrated power circuit in applications in which a satisfactory flyback performance is required at high deflection frequencies and wherein the detrimental effect of the damping impedance is not optimally compensated. This kind of applications which, have to cope with high deflection frequencies, such as, 100 Hz applications, or multimedia applications suitable to display computer display graphics, become more and more important. In these applications, the scan voltage stays in the usual range as the resistance of the deflection coil and not the inductance is relevant during the scan period. However, during the short flyback period, a high flyback supply voltage is needed as the deflection coil behaves as an inductance. At such a high flyback supply voltage, the difference between the flyback supply voltage and the scan supply voltage is much larger than usual. Therefore, in these applications, the influence of the damping impedance on the deterioration of the flyback behavior is large. At the maximum permissible flyback voltage of the integrated circuit, the shortest possible flyback time is reached with a satisfactory flyback performance by optimally compensating for the influence of the damping impedance. Without an optimal compensation, a distance between scan lines at the start of the scan will be too small (top fold over due to too less compensation), or the distance between scan lines is too large (line spacing due to too much compensation).

In the above embodiment of the invention, an optimal compensation of the influence of the damping impedance is reached by coupling the current generating circuit to the series resistor or the conversion resistor to generate a correction current during at least the last part of the flyback period to compensate for the current through the damping impedance. If the current generating circuit is coupled to the series resistor, the correction current is diverted from the series resistor to prevent the current through the damping impedance to flow through the series resistor.

If the current generating circuit is coupled to the conversion resistor, the correction current is supplied to the conversion resistor to enlarge the current through the conversion resistor. Now, the current through the series resistor is allowed to reach a higher value before the flyback supply voltage will be disconnected, thereby preventing a disconnection of the flyback supply voltage at a too low value of the deflection current. This effect will already be reached if the current generating circuit is active only during the last part of the flyback period. As during the last part of the flyback period, the level of the input current to the first output amplifier reaches the certain level at which the flyback supply voltage is disconnected.

Due to the fact that the current generating circuit is coupled to the series resistor or the conversion resistor which are not within the integrated circuit, it is easy to provide a current determining element outside the integrated circuit, so that the amount of correction current generated by the current generating circuit can easily be adapted to fit the demand as determined by the values of the impedances of the deflection coil and the damping impedance thereby enabling an optimal compensation of the current through the damping impedance. So, the deflection circuit according to the invention can be used in applications in which the deflection circuit with the known compensation was not able to reach a satisfactory flyback performance for short flyback times.

The prior art provides a fixed compensation of the influence of the damping impedance by delaying the moment of the disconnecting of the flyback supply voltage. The prior art does not divert a current flowing through the damping impedance from the series resistor during the flyback period to prevent the current through the damping impedance to influence the value of the deflection current. The prior art also does not supply an extra current through the conversion resistor during the flyback period to compensate for the extra current flowing through the series resistor due to the current through the damping impedance.

In another embodiment of the invention, the current flowing through the damping resistor during the flyback period is, at least during the last part of the flyback period, compensated by generating a correction current which flows through the conversion resistor to enlarge the voltage across the conversion resistor. In this way, the current through the series resistor is allowed to reach a higher value before the flyback supply voltage is disconnected.

In another embodiment of the invention, the correction current depends on the value of the flyback supply voltage as occurring across the deflection coil. During the flyback period, the current through the damping impedance depends on the flyback voltage. This dependency can be compensated for automatically by generating an amount of correction current that also depends on the flyback voltage. This is advantageous as the value of the flyback voltage may differ dependent on the impedance of the deflection coil or may vary due to tolerances or aging.

In a further embodiment of the invention, the current determining resistor is coupled across the series arrangement of the deflection coil and the series resistor via a pnp transistor which is conductive during the flyback period. A DC-voltage is applied to the base of the pnp transistor which is selected such that during the scan period, this DC-voltage is higher than the scan voltage on the emitter of the pnp transistor such that the pnp transistor does not conduct during the scan period. And, the DC-voltage is selected such that, during the flyback period, the flyback voltage on the emitter of the pnp transistor is higher than the DC-voltage such that the pnp transistor conducts during the flyback period. This has the advantage that the transistor is switched automatically by the voltage occurring on the deflection coil without the need for a control circuit.

Another embodiment of the invention has the advantage that a cheap zener diode can be used. The zener diode has a zener voltage large enough to obtain a non-conductive zener diode during the scan period and low enough to obtain a conducting zener diode during the flyback period. A further advantage is that the voltage across, and thus, the current through the current determining resistor depends on the actual value of the flyback voltage. This enables a better compensation of the current through the damping impedance which also depends on the flyback voltage during the flyback period.

These and other aspects of the invention will be described and elucidated with reference to the accompanying drawings.

DESCRIPTION OF THE PREFERRED EMBODIMENTS

Figure 1:
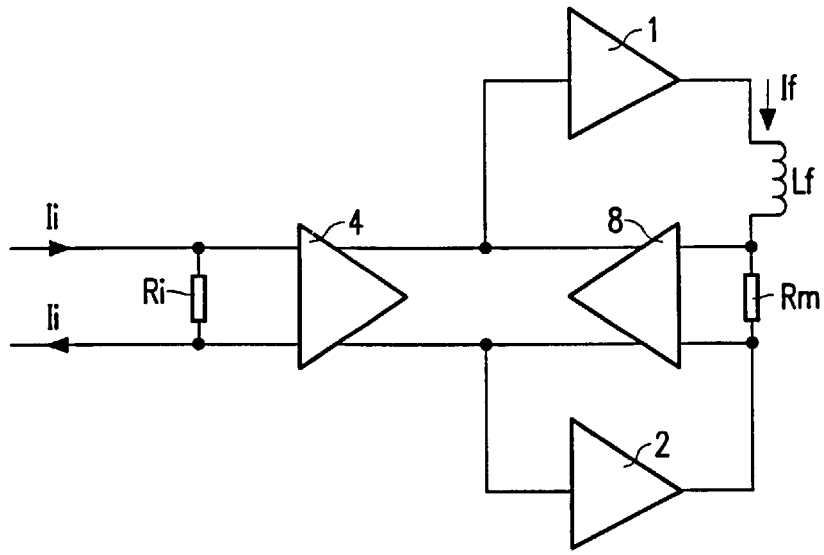
FIG. 1 shows a frame deflection circuit according to the prior art.

FIG. 1 shows a frame deflection circuit according to the prior art. The frame deflection circuit comprises a frame deflection coil Lf arranged in series with a measurement resistor Rm. The frame deflection circuit further comprises an integrated power circuit which contains a first output amplifier 1, a second output amplifier 2, a first voltage-to-current converter 8 and a second voltage-to-current converter 4. The series arrangement of the deflection coil Lf and the measurement resistor Rm is connected between an output of the first output amplifier 1 and an output of the second output amplifier 2 to be driven in a bridge configuration for generating a deflection current If through the deflection coil Lf. A voltage, which corresponds to the deflection current If, is generated across the measurement resistor Rm. The voltage across the measurement resistor Rm is sensed with the first voltage to current converter 8 which has a first and a second current output. To provide a feedback, the first current output is connected to an input of a first output amplifier 1, and the second current output is connected to an input of the second output amplifier 2. An input waveform is generated by an input current Ii flowing through an input resistor Ri which is arranged between two inputs of the second voltage-to-current converter 4. The second voltage-to-current converter 4 has a first and a second current output. The first current output is connected to the input of the first output amplifier 1, and the second current output is connected to the input of the second output amplifier 2. The first and the second voltage-to-current converters 8, 4 are identical. The current outputs of the first and the second voltage-to-current converters 8, 4, which are interconnected, supply output currents which have opposite polarities. In this way, the output voltages of the first and second output amplifiers 1, 2 will be controlled such that the voltage across the measurement resistor Rm is substantially equal to the voltage across the input resistor Ri. In practical applications, the value of the measurement resistor Rm is on the order of 0.5 Ohms. The deflection current Id causes a peak-peak voltage across the measurement resistor Rm on the order of one volt. The same holds then for the peak-peak voltage of the input waveform. The first and second voltage-to-current converters 8, 4 comprise bipolar differential input stages T1, T2 (see FIG. 2) with emitter resistors Re1, Re2 to handle the high voltage swing. An offset voltage occurs due to mismatch of the emitter resistors Re1, Re2. This offset voltage gives rise to a DC-shift of the deflected picture. A further lowering of the value of the measurement resistor Rm is not practical as the influence of parasitic effects, such as a resistance and an inductance of tracks on a printed board, becomes too large.

Figure 2A:
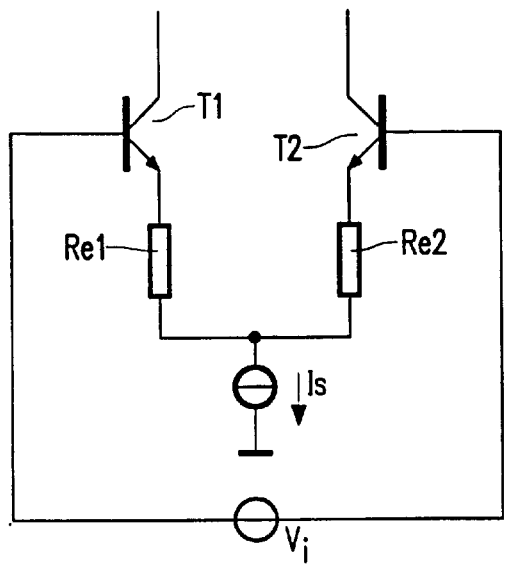
FIGS. 2A and 2B show differential input stages for explaining the occurrence of the offset.
Figure 2B:
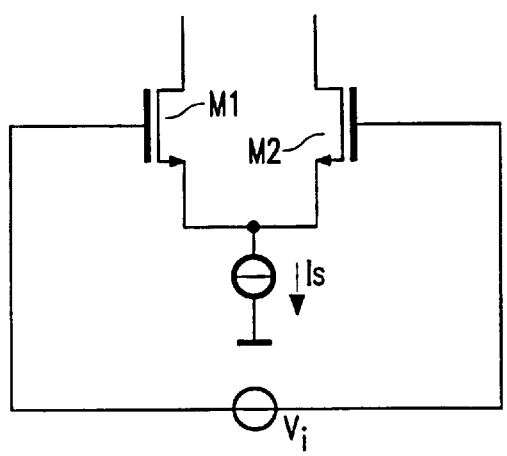

FIGS. 2A and 2B show differential input stages for explaining the occurrence of the offset. FIG. 2A shows a differential input stage which comprises bipolar transistors of the npn type. A first bipolar transistor T1 has an emitter connected to a first terminal of a current source Is via a first emitter resistor Re1. A second bipolar transistor T2 has an emitter connected to the first terminal of the current source Is via a second emitter resistor Re2. A second terminal of the current source Is is connected to a suitable potential which, in this case, is ground potential. A collector of the first and second bipolar transistor draw a current which depends on an input voltage Vi supplied by an input voltage source Vi connected between a basis of the first bipolar transistor and a basis of the second bipolar transistor.

The collector current of a bipolar transistor is expressed as:

$$I_c = I_{cs} \cdot e^{\frac{e \cdot V_{be}}{kT}}$$

The input voltage Vi between the basis of the bipolar transistor can be written as:

$$V_{in} = V_{be1} + V_{Re1} - V_{Re2} - V_{be2}$$

$$V_{in} = \frac{kT}{e} \ln \frac{I_{c1}}{I_{cs1}} + I_{c1} \cdot R_{e1} - I_{c2} \cdot R_{e2} - \frac{kT}{e} \ln \frac{I_{c2}}{I_{cs2}}$$

The offset voltage is the input voltage occurring when both collector currents are equal:

$$V_{offset} = \frac{kT}{e} \ln \frac{I_{cs2}}{I_{cs1}} + \frac{1}{2} I_s \Delta R_e$$

Hence, the offset voltage comprises a fixed term and a term depending on the product of the current flowing in the current source Is and the difference of values of the emitter resistors Re1, Re2. The offset voltage increases if the current flowing in the current source Is or the values of the emitter resistors Re1, Re2 has to be increased to cope with a large input voltage swing.

FIG. 2B shows a differential input stage which comprises field effect transistors (further denoted with FET). A source of a first FET M1 and a source of a second FET M2 are connected to a first terminal of a current source Is. A second terminal of the current source Is is connected to a suitable potential. A drain of the first and second FET draw a current which depends on an input voltage Vi supplied by an input voltage source Vi connected between a gate of the first FET and a gate of the second FET.

The drain current of a FET can be expressed as:

$$I_d = \beta/2 \cdot (V_{gs} - V_T)^2$$

wherein:

$$\beta = \mu \cdot c_{ox} \cdot W/L$$

W=width of channel
L=length of channel
Cox=capacity of oxide between gate and channel
$\mu$=mobility of the charge carriers.

The input voltage Vi between the gates of the FET's can be written as:

$$V_{in} = V_{gs1} - V_{gs2}$$

$$V_{in} = \sqrt{\frac{2I_{d1}}{\beta_1}} + V_{T1} - \sqrt{\frac{2I_{d2}}{\beta_2}} - V_{T2}$$

The offset voltage is the input voltage occurring when both drain currents are equal:

$$V_{offset} = \sqrt{I_s} \cdot \left( \frac{1}{\sqrt{\beta + \frac{1}{2}\Delta\beta}} - \frac{1}{\sqrt{\beta - \frac{1}{2}\Delta\beta}} \right) + \Delta V_T$$

Hence, the offset voltage comprises a fixed term and a term depending on the current flowing in the current source Is. The offset voltage increases if the current flowing in the current source Is has to be enlarged to cope with a large input voltage swing.

Figure 3:
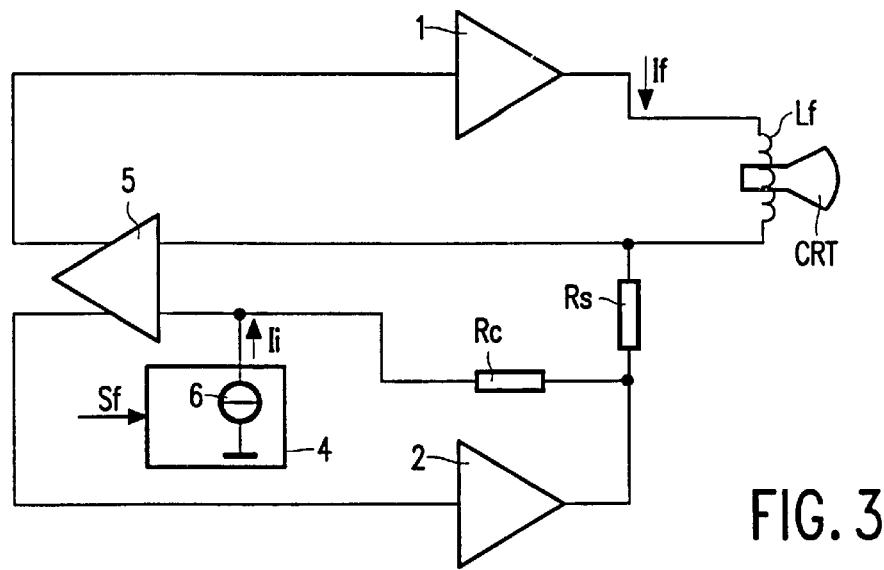
FIG. 3 shows a picture display apparatus with a frame deflection circuit according to the invention.

FIG. 3 shows a picture display apparatus with a frame deflection circuit according to the invention. The picture display apparatus further comprises a synchronization circuit 4, a frame deflection coil Lf, and a cathode ray tube CRT. The synchronization circuit 4 receives a frame synchronization signal Sf of a video signal, and generates a reference waveform which is supplied to an input of the frame deflection circuit as an input current Ii. The deflection coil is magnetically coupled to the cathode ray tube CRT to generate a frame deflection of electron beams in the cathode ray tube CRT. The frame deflection may be a deflection in the vertical direction if a picture is composed by subsequently scanning horizontal lines in the vertical direction, as is common practice. The frame deflection may be a deflection in horizontal direction if a picture is composed by subsequently scanning vertical lines in the horizontal direction, as is the case with the so-called transposed scanning. Although the invention is particularly useful in frame deflection circuits, it is also possible to drive a line deflection coil with the deflection circuit according to the invention. The frame deflection circuit comprises an integrated power circuit which contains a first output amplifier 1, a second output amplifier 2, and a differential amplifier 5, a series resistor Rs, and a conversion resistor Rc. The series resistor Rs is arranged in series with the deflection coil Lf. The series arrangement of the deflection coil Lf and the series resistor Rs is connected between an output of the first output amplifier 1 and an output of the second output amplifier 2 to be driven in a bridge configuration for generating a deflection current If through the deflection coil Lf. Across the series resistor Rs, a voltage is generated which corresponds to the deflection current If. The differential amplifier 5 has a first input connected to a connection point of the deflection coil Lf and the series resistor Rs. A second input of the differential amplifier 5 is connected via the conversion resistor Rc to an end of the series resistor Rs which is not connected to the deflection coil Lf. An input current source 6 is connected to the second input of the differential amplifier 5 to supply an input current Ii which flows through the conversion resistor Rc. Thus, the differential amplifier 5 receives, between its inputs, the voltage across a series arrangement of the conversion resistor Rc and the series resistor Rs. The polarity of the input current Ii is selected to obtain a voltage across the conversion resistor Rc which has an opposite polarity with respect to the voltage across the series resistor Rs. The differential amplifier 5 has two outputs connected to respective inputs of the first and the second output amplifiers 1, 2 to drive the two output amplifiers 1, 2 in a feedback loop such that the voltage across the series arrangement of the conversion resistor Rc and the series resistor Rs becomes equal to zero. In this way, the voltage swing between the inputs of the differential amplifier 5 is very low. In case the differential amplifier contains a bipolar differential input stage, the emitter resistors Re1, Re2 (see FIG. 2A) can be modified to a lower value or can even be omitted, and thus, the offset caused becomes very low. In case the differential amplifier contains a FET input stage, the current flowing through the current source Is (see FIG. 2B) can be decreased thereby obtaining a lower offset. It is assumed that the first output amplifier 1 supplies the high flyback voltage during the flyback period. The differential amplifier 5 only needs to withstand the scan supply voltage.

The conversion resistor Rc may alternatively be arranged between the first input of the differential amplifier 5 and the connection point of the deflection coil Lf and the series resistor Rs. In this case, the value of the conversion resistor Rc should be large enough to prevent the input current, which flows through it, from disturbing the voltage across the series resistor Rs too much. The polarity of the input current has to be chosen to withdraw current from the first input of the differential amplifier 5 to obtain a voltage across the conversion resistor Rc in opposite polarity to the voltage across the series resistor Rs.

With regard to the above described two embodiments, it is also possible to exchange the position of, on the one hand, the deflection coil Lf and on the other hand, the series resistor Rs with the thereto coupled conversion resistor Rc and differential amplifier 5. The differential amplifier 5 should than be able to withstand the flyback voltage.

If one end of the conversion resistor Rc is connected to an output of the first or the second output amplifier 1, 2, the buffer can be replaced by a differential-to-single converter. This converter generates a single output current or voltage connected to the other end of the conversion resistor Rc. Such a single output converter has a simpler construction than a buffer thereby decreasing the offset. Although the above described frame deflection circuit is based on a differential amplifier 5 with current outputs and a first and second output amplifier 1, 2 with current inputs, numerous alternatives are possible. As an example, the differential amplifier 5 may supply a voltage to the input of the first output amplifier 1. An inverter stage inverts this voltage to supply the inverted voltage to the second output stage 2.

Figure 4:
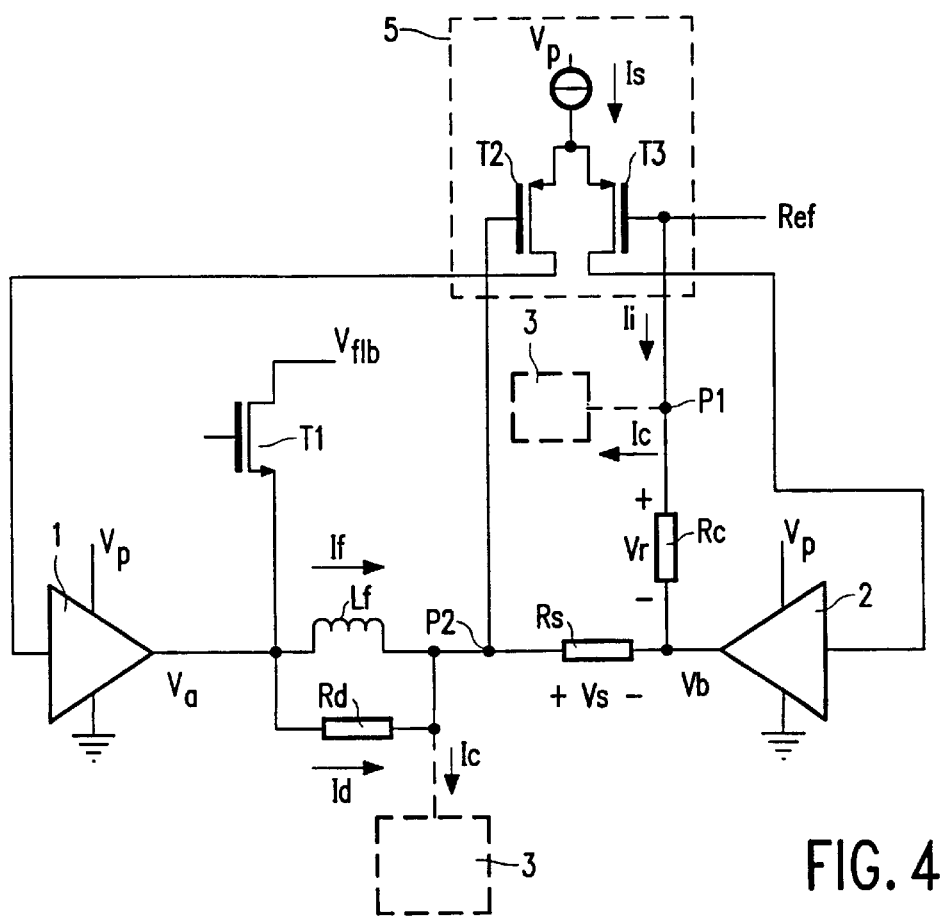
FIG. 4 shows a detailed circuit diagram of a frame deflection circuit according to the invention.

FIG. 4 shows a more detailed frame deflection circuit according to the invention. This frame deflection circuit comprises a first and a second output amplifier 1, 2 arranged in a bridge configuration. Each of the output amplifiers 1, 2 receives a scan supply voltage Vp. The first output amplifier 1 has an output which supplies a voltage Va, the second output amplifier 2 has an output which supplies a voltage Vb. A series arrangement of a deflection coil Lf and a series resistor Rs is connected between the output of the first output amplifier 1 and the output of the second output amplifier 2. The damping resistor Rd is arranged in parallel with the deflection coil Lf. A flyback supply voltage Vflb is connected, via a semiconductor switch Ti which is shown as a field effect transistor (further denoted as FET), to the output of the first output amplifier 1. The FET T1 connects the flyback supply voltage Vflb to the deflection coil Lf during the flyback period Tf. The differential amplifier comprises a first FET T2, a second FET T3 and a current source Is. The source of the first FET T2 is connected to the source of the second FET T3 and to one end of the current source Is. The other end of the current source Is is connected to the scan supply voltage Vp. A gate of the first FET T2 is connected to a connection point of the deflection coil Lf and the series resistor Rs. This connection point is further referred to as the second connection point P2. A gate of the second FET T3 is connected to the output of the second output amplifier 2 via a conversion resistor Rc, and receives the input current Ii. The gates of the first and second FET's T2, T3 constitute a first and second input of the differential amplifier 5. The connection point of the gate of the second FET T3 and the conversion resistor Rc is further referred to as the connection point P1. A drain of the first FET T2 is connected to an input of the first output amplifier 1. A drain of the second FET T3 is connected to an input of the second output amplifier 2. The drains of the first and second FET's T2, T3 constitute outputs of the differential amplifier 5. The current generating circuit 3 is connected to the first or second connection point P1, P2.

This frame deflection circuit operates as follows. The input current Ii causes a reference voltage Vr across the conversion resistor Rc. The current Is through the series resistor Rs causes a voltage Vs across the series resistor Rs. The differential amplifier 5 receives the sum of the voltage Vs and the reference voltage Vr between its inputs, and supplies currents at its outputs to drive the first and the second output amplifiers 1, 2 such that this sum is kept zero. In this way, the output amplifiers 1, 2 are controlled to supply the output voltages Va, Vb to obtain a voltage Vs across the series resistor Rs which has an opposite polarity with respect to the reference voltage Vr. The influence of the damping resistor Rd and the corrective action of the current generating circuit 3 are elucidated in the description of FIGS. 5A and 5B.

Figure 5A:
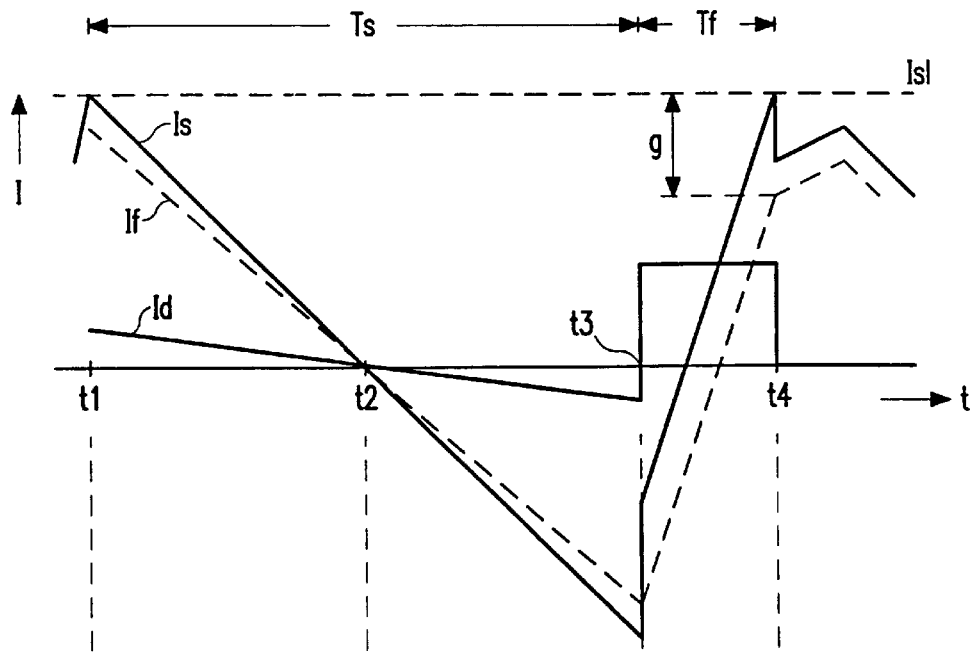
FIGS. 5A and 5B show waveforms for explaining the effect of a damping resistor.
Figure 5B:
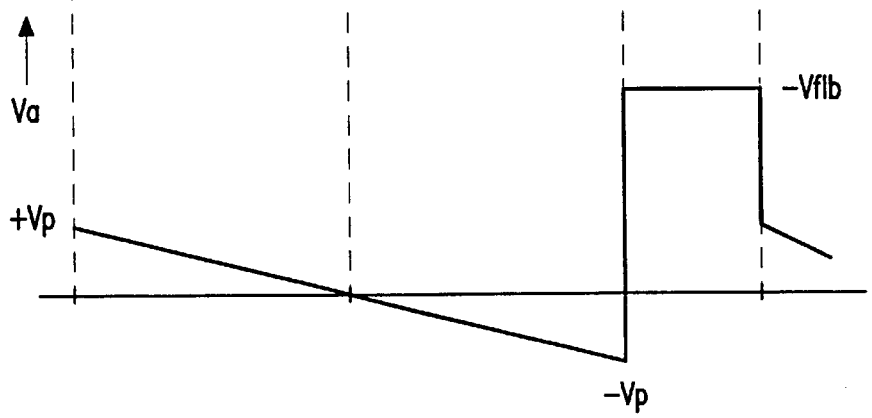

FIG. 5A shows waveforms of the current Is through the series resistor Rs, the deflection current If, and the current Id through the damping resistor Rd, respectively, all as a function of time. The deflection current If is represented by a dashed line. Figure SB shows the voltage Va–Vb occurring across the series arrangement of the deflection coil Lf and the series resistor Rs. Especially during the flyback period this is a simplified waveform. Moment t1 denotes the start of a scan period Ts. Moment t2 denotes the middle of the scan period. Moment t3 denotes the end of the scan period Ts and the start of the flyback period Tf. Moment t4 denotes the end of the flyback period Tf and the start of a subsequent scan period Ts. For clarity, the duration of the flyback period Tf has been exaggerated.

During the scan period Ts, in a first approximation, the deflection coil Lf behaves as a resistor. So, the voltage across the deflection coil Lf should be substantially sawtooth shaped to obtain a substantial sawtooth current through the deflection coil Lf. At the start t1 of a scan period Ts, the output voltage Va of the first output amplifier 1 is approximately equal to the scan supply voltage Vp, the output voltage Vb of the second output amplifier 2 is approximately equal to ground potential, and thus approximately a scan supply voltage Vp occurs across the deflection coil Lf. The scan voltage Vp is selected to be high enough to generate a desired maximum value of the deflection current If, and as low as possible to minimize the dissipation in the first output amplifier 1. The value of this scan supply voltage Vp also determines the current Id through the damping impedance Rd during the scan period. The current Is through the series resistor Rs is composed out of the deflection current If through the deflection coil Lf and the current Id through the damping resistor Rd. The differential amplifier 5 receives the addition of the voltage Vs across the series resistor Rs and the voltage Vr across the conversion resistor Rc. The differential amplifier drives the first and second output amplifiers 1, 2 to supply a value of the output voltages Va and Vb such that the voltage Vs occurring across the series resistor Rs becomes equal in value but opposite in polarity to the voltage Vr across the conversion resistor Rc. Due to the fact that the voltage Vr across the series resistor Rs is also determined by the current Id through the damping resistor Rd, the actual deflection current Id has a somewhat lower amplitude compared with the situation without a damping resistor Rd.

At the end t4 of the flyback period Tf, a flyback supply voltage Vflb occurs across the deflection coil Lf. During the flyback period Tf, in a first approximation, the deflection coil Lf acts as an inductance. This flyback supply voltage Vflb has a larger value than the scan supply voltage Vp to be able to change the polarity of the deflection current If within the short flyback period Tf. Thus, the current Id through the damping resistor Rd is larger during the flyback period Tf than during the scan period Ts. The flyback supply voltage Vflb will be disconnected from the deflection coil Lf at the moment an input current of the first output amplifier 1 decreases below a certain value. Or, alternatively, the voltage Vr across the series resistor Rs reaches the flyback voltage level of the reference waveform Ref. Due to the high extra current through the series resistor Rs caused by the high voltage across the damping resistor Rd, the disconnection of the flyback supply voltage Vflb is activated at a relatively low value of the deflection current If. So, the value of the deflection current If at the end t4 of the flyback period Tf is lower than the amount of deflection current If as desired at the start t1, t4 of the scan period Ts. This difference in amounts of the deflection current If, is denoted in FIG. 5A as g. Before starting a next frame scan, the too low amount of deflection current (If) at the end t4 of the flyback period Tf has to increase to the higher amount of the deflection current If as desired at the start t4 f the scan period Ts. This transition has to be performed with the low scan supply voltage Vp (as an example, a practical value is 14 volts) and thus will take substantially more time than is the case if the flyback can be wholly performed which the high flyback supply voltage Vflb (as an example, a practical value is 60 volts).

The frame deflection circuit according to the invention solves this problem by adding a current generating circuit 3 which is coupled to the series resistor Rs and/or the conversion resistor Rc to generate a correction current Ic during at least the last part of the flyback period Tf. If the current generating circuit 3 is connected to the series resistor Rs, the correction current Ic is diverted from the series resistor Rs to prevent the current Id through the damping impedance Rd to flow through the series resistor Rs. If the current generating circuit 3 is coupled to the conversion resistor Rc, the correction current Ic enlarges the input voltage Vi across the conversion resistor Rc. Now, the current through the series resistor Rs is allowed to reach a higher value before the flyback supply voltage Vflb will be disconnected, thereby preventing a disconnection of the flyback supply voltage Vflb at a too low value of the deflection current If.

FIGS. 6A–6F show circuit diagrams of embodiments of current generating circuits 3 according to the invention.

The embodiments shown in FIG. 6A to 6D generate a current I to a connection point P. This point P may be the first connection point P1 which denotes the connection point of the current generating means 3 and the conversion resistor Rc or the second connection point P2 which denotes the connection point of the current generating means 3 and the series resistor Rs. In these cases the current I is the correction current Ic. The current I may also be supplied as the reference current Iref to an input P3 of the current mirror, as shown in FIG. 6E.

In the frame deflection circuit shown in FIG. 4, the current generating circuit 3 supplies a correction current Ic to the first connection point P1 to enlarge the voltage Vi across the conversion resistor Rc. If the current generating circuit 3 is connected in other ways to the conversion resistor Rc, the direction of the correction current Ic again has to be selected such as to enlarge the voltage across the conversion resistor Rc. If the current generating circuit 3 is connected to the second connection point P2, as shown in FIG. 4, the correction current Ic should be withdrawn from the series resistor Rs to divert the current Id flowing through the damping impedance Rd from the series resistor Rs. If the position of the deflection coil Lf and the series resistor Rs are interchanged, the correction circuit 3, which is still connected to the connection point of the deflection coil Lf and the series resistor Rs, has to supply the correction current Ic to the series resistor Rs such that the current Id through the damping impedance Rd will not flow through the series resistor Rs.

Figure 6A:
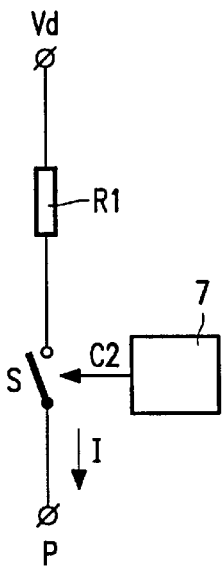
FIGS. 6A–6F show circuit diagrams of embodiments of current generating circuits 3 according to the invention.

FIG. 6A shows a series arrangement of a current determining resistor R1 and a semiconductor switch S. The series arrangement receives a voltage Vd and supplies a current I to the connection point P during a conduction period of the semiconductor switch S. A control input of the semiconductor switch S receives a control signal C2 from a control sign generator 7 which causes the semiconductor switch S to conduct at least during a last part of the flyback period Tf. The current I depends on the values of the voltage Vd and the current determining resistor R1. The voltage Vd has to be selected to supply the current I in the desired direction.

Figure 6B:
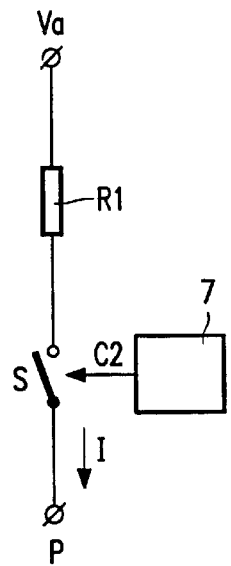

FIG. 6B differs from FIG. 6A in that the voltage Vd is selected to be a deflection voltage Va, Vb at the end of the deflection coil Lf not connected to the series resistor Rs. In this way, the current I depends on the flyback voltage Vflb.

Figure 6C:
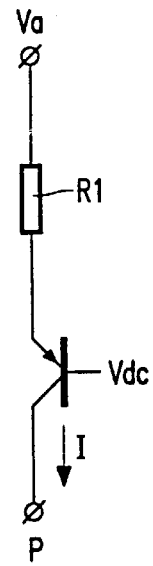

In FIG. 6C, the semiconductor switch S is a pnp transistor T6 which has an emitter connected to the voltage Va at the output of the first output amplifier 1 via the current determining resistor R1. The base of the pnp transistor T6 is connected to a DC-voltage selected such that the pnp transistor T6 conducts during the flyback period Tf during which the deflection voltage Va is approximately equal to the high flyback supply voltage Vflb. The collector of the pnp transistor T6 supplies the current I.

Figure 6D:
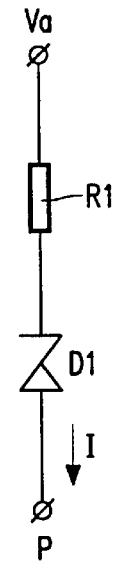
Figure 6E:
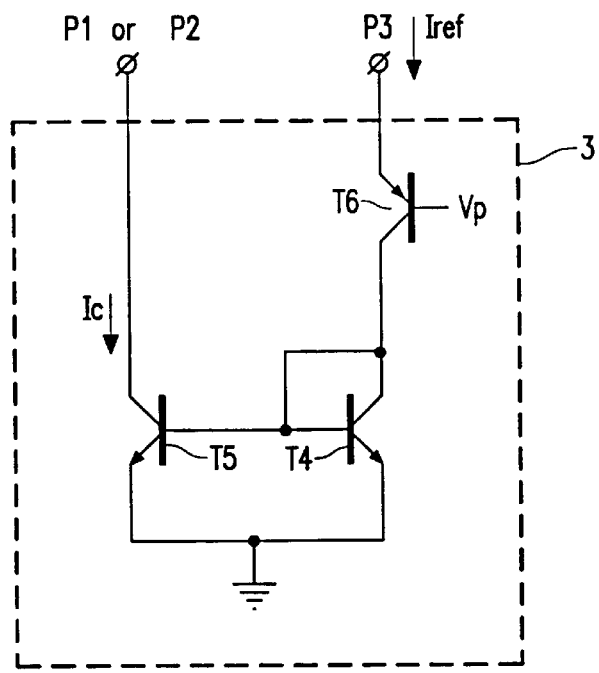

FIG. 6D differs from FIG. 6C in that the pnp transistor T6 is replaced by a zener diode D1. An anode of the zener diode D1 is directed towards the connection point P if the supply voltage is the output voltage Va of the first output amplifier 1. It is clear that in the situation that a current I has to be withdrawn, the output voltage Va of the first output amplifier 1 has to be replaced by the output voltage Vb of the second output amplifier 2 and that the direction of the zener diode D1 has to be altered.

FIG. 6E shows a current generating circuit 3 which comprises a current mirror with a first transistor T4 and a second transistor T5, both of the npn type, and a third transistor T6 of the pnp type. A base and a collector of the first transistor T4 are interconnected. The base of the first transistor T4 is connected to a base of the second transistor T5. The emitters of the first and the second transistor T4, T5 are connected to the same voltage, which in FIG. 6E is ground potential. A collector of the second transistor T5 is connected to the first or second connection point P1, P2 to supply the correction current Ic. An emitter of the third transistor T6 receives a reference current Iref at the connection point P3. The third transistor T6 has a base connected to the scan supply voltage Vp or any other suitable fixed voltage, and a collector connected to the collector of the first transistor T4. The current through the first transistor T4 is determined by the reference current Iref. This reference current Iref is mirrored by the first and second transistor T4, T5 to obtain the correction current Ic. It is also possible to connect the emitters of the first and second transistor T4, T5 to a suitable voltage which is lower than the scan supply voltage Vp and the voltage on the first or second connection point P1, P2, as may be the case with the output voltage Vb of the second output amplifier 2. The reference current Iref can be generated in any of the ways shown in FIG. 6A to 6D.

Figure 6F:
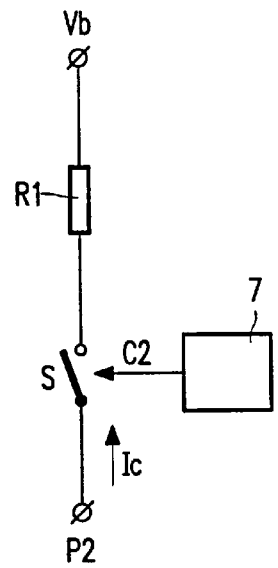

FIG. 6F shows a current generating circuit 3 which comprises a series arrangement of a resistor R1 and a semiconductor switch S, whereby the series arrangement is arranged in parallel with the series resistor Rs. A control input of the semiconductor switch S receives a control signal C2 which causes the semiconductor switch S to conduct at least during a last part of the flyback period Tf.

While the invention has been described in connection with preferred embodiments, it will be understood that modifications thereof within the principles outlined above will be evident to those skilled in the art and thus the invention is not limited to the preferred embodiments but is intended to encompass such modifications.

We claim:

1. A deflection circuit for generating an electron beam deflection current in a deflection coil, the deflection circuit comprising:

a first and a second output amplifier;

a series resistor arranged in series with the deflection coil, the series arrangement of the deflection coil and the series resistor being coupled between an output of the first output amplifier and an output of the second output amplifier; and a differential amplifier having a first input coupled to a first end of the series resistor, and having outputs coupled to corresponding inputs of the first and the second output amplifiers, respectively, for driving the first and second output amplifiers in a bridge configuration, characterized in that the deflection circuit further comprises a conversion resistor having:

a first end coupled to a second input of the differential amplifier, the first end receiving an input current having an input waveform, and a second end coupled to a second end of the series resistor.

2. A deflection circuit as claimed in claim 1, wherein the deflection circuit further comprises:

a damping impedance arranged in parallel with the deflection coil; and current generating means coupled to the series resistor for diverting a correction current from the series resistor during at least a last part of a flyback period of the deflection current.

3. A deflection circuit as claimed in claim 1, wherein the deflection circuit further comprises:

a damping impedance arranged in parallel with the deflection coil; and current generating means coupled to the second input of the differential amplifier for supplying a correction current for enlarging the current through the conversion resistor during at least a last part of a flyback period of the deflection current.

4. A deflection circuit as claimed in claim 2, wherein the current generating means comprises a current mirror having an input for receiving a reference current and an output for supplying the correction current in relation to the reference current.

5. A deflection circuit as claimed in claim 2, wherein the current generating means further comprises:

a series arrangement of a current determining impedance and a semiconductor switch, said series arrangement being coupled between a voltage source and the the series resistor; and a control circuit receiving information related to the flyback period and being coupled to the semiconductor switch for causing the semiconductor switch to be conductive during at least the last part of the flyback period.

6. A deflection circuit as claimed in claim 5, wherein the deflection circuit further comprises means for connecting a flyback supply voltage to the output of the first output amplifier during the flyback period, and wherein the voltage source of the current generating means is constituted by a deflection voltage at an end of the deflection coil not coupled to the series resistor.

7. A deflection circuit as claimed in claim 2, wherein the deflection circuit further comprises means for connecting a flyback supply voltage to the output of the first output amplifier during the flyback period, and wherein the current generating means comprises a transistor of the pnp type having a control electrode, and a main current path being arranged in series with a current determining impedance, an emitter of the transistor being coupled to an end of the deflection coil not coupled to the series resistor, via the current determining impedance, a collector of the transistor being coupled to the the series resistor, whereby the control electrode receives a DC-voltage for making the transistor conductive during the flyback period and non-conductive during the scan period.

8. A deflection circuit as claimed in claim 2, wherein the deflection circuit further comprises means for connecting a flyback supply voltage to the output of the first output amplifier during the flyback period, and wherein the current generating means comprises a series arrangement of a zener diode and a current determining impedance, the series arrangement being coupled between the end of the deflection coil not coupled to the series resistor, and the series resistor, and whereby the zener diode is made conductive during the flyback period and non-conductive during the scan period (Ts).

9. A deflection circuit as claimed in claim 2, wherein the current generating means comprises:

a series arrangement of a semiconductor switch and a current determining impedance, said series arrangement being coupled in parallel to the series resistor for diverting the correction current from the series resistor; and a control circuit receiving information related to the flyback period and being coupled to the semiconductor switch for causing the semiconductor switch to be conductive during at least the last part of the flyback period.

10. A picture display apparatus comprising:

a cathode ray tube with a frame deflection coil;

a frame deflection circuit generating a deflection current through the frame deflection coil for deflecting an electron beam in the cathode ray tube, the frame deflection circuit comprising:

a first and a second output amplifier;

a series resistor arranged in series with the deflection coil, the series arrangement of the deflection coil and the series resistor being coupled between an output of the first output amplifier and an output of the second output amplifier; and a differential amplifier having a first input being coupled to a first end of the series resistor, and having outputs coupled to corresponding inputs of the first and the second output amplifiers, respectively, for driving the first and second output amplifiers in a bridge configuration, characterized in that the frame deflection circuit further comprises a conversion resistor having:

a first end coupled to a second input of the differential amplifier, the first end receiving an input current having an input waveform, and a second end coupled to a second end of the series resistor.

11. An integrated circuit for use in a deflection circuit as claimed in claim 1, whereby the integrated circuit comprises the first and the second output amplifiers, and the differential amplifier.

12. A deflection circuit as claimed in claim 3, wherein the current generating means comprises a current mirror having an input for receiving a reference current and an output for supplying the correction current in relation to the reference current.

13. A deflection circuit as claimed in claim 3, wherein the current generating means further comprises:

a series arrangement of a current determining impedance and a semiconductor switch, said series arrangement being coupled between a voltage source and the conversion resistor; and a control circuit receiving information related to the flyback period and being coupled to the semiconductor switch for causing the semiconductor switch to be conductive during at least the last part of the flyback period.

14. A deflection circuit as claimed in claim 13, wherein the deflection circuit further comprises means for connecting a flyback supply voltage to the output of the first output amplifier during the flyback period, and wherein the voltage source of the current generating means is constituted by a deflection voltage at an end of the deflection coil not coupled to the series resistor.

15. A deflection circuit as claimed in claim 3, wherein the deflection circuit further comprises means for connecting a flyback supply voltage to the output of the first output amplifier during the flyback period, and wherein the current generating means comprises a transistor of the pnp type having a control electrode, and a main current path being arranged in series with a current determining impedance, an emitter of the transistor being coupled to an end of the deflection coil not coupled to the series resistor, via the current determining impedance, a collector of the transistor being coupled to the conversion resistor, whereby the control electrode receives a DC-voltage for making the transistor conductive during the flyback period and non-conductive during the scan period.

16. A deflection circuit as claimed in claim 3, wherein the deflection circuit further comprises means for connecting a flyback supply voltage to the output of the first output amplifier during the flyback period, and wherein the current generating means comprises a series arrangement of a zener diode and a current determining impedance, the series arrangement being coupled between the end of the deflection coil not coupled to the series resistor, and the conversion resistor, whereby the zener diode is made conductive during the flyback period and non-conductive during the scan period.

\* \* \* \* \*